Oct. 30, 1956  C. E. CRAWFORD  2,768,644
CONTROL VALVES

Filed Jan. 2, 1952  2 Sheets-Sheet 1

INVENTOR.
Carlos E Crawford
BY
Wayland D. Keith
HIS AGENT

Oct. 30, 1956  C. E. CRAWFORD  2,768,644
CONTROL VALVES
Filed Jan. 2, 1952  2 Sheets-Sheet 2

INVENTOR.
Carlos E. Crawford
BY
Wayland D. Keith
HIS AGENT

United States Patent Office 2,768,644
Patented Oct. 30, 1956

2,768,644

CONTROL VALVES

Carlos E. Crawford, Wichita Falls, Tex.

Application January 2, 1952, Serial No. 264,397

9 Claims. (Cl. 137—510)

This invention relates to improvements in differential flow control valves and more particularly to differential control valves for controlling the flow of liquids from separators, tanks and the like.

Various control valves have been proposed heretofore, but these for the most part have been inadequate in certain respects which prevented them being used with a number of liquids. Furthermore, most of the control valves in use heretofore were not sufficiently sensitive as to be readily adaptable to the control of the flow of liquids by a differential of pressure, and they did not give a uniform, graduated increase in flow in direct proportion to the opening of the valve.

In the producing of oil from oil wells, wherein varying amounts of oil are produced, it is desirable to control the flow of this oil out of a vessel into the storage tank and it is often necessary to control the flow of the oil to the storage tank under pressure so as to elevate the oil into the storage tank and also to maintain a gas pressure within the vessel so the gas many be delivered to some point remote from the vessel. While the present invention is applicable to controlling the flow of oil automatically from a vessel, which is generally of the nature of a separator, it is also applicable for controlling the flow of other liquids, such as water or the like, and which valve is operable by any gaseous pressure, such as that of air, at a point remote from the vessel to enable the control valve to be operated manually or automatically in accordance with the installation and with the service to be performed.

An object of this invention is to provide a valve that is pressure responsive to give a graduated flow of liquid in proportion to a differential of pressure.

Another object of this invention is to provide a control valve which has a self contained diaphragm that is responsive to a hydrostatic head to give a uniform controlled flow of liquid through the valve.

Still another object of the invention is to provide a valve housing which has a self contained actuating diaphragm within the valve housing that is pressure responsive to gas pressure within a vessel on one side of the diaphragm and which is pressure responsive to the hydrostatic head in the vessel on the other side of the diaphragm.

A still further object of this invention is to provide a pressure controlled valve that may be pressure actuated by pressure remote from the valve so as to release any and all fluids in a uniform graduated relation.

Yet another object of this invention is to provide a valve for the control of the flow of liquid that is simple in construction and that requires a minimum of servicing.

An embodiment of this invention is illustrated in the accompanying drawings in which like reference characters designate like parts in the several views thereof, in which Fig. 1 is a side elevational view of a separator with parts broken away and shortened and showing a valve embodying the invention attached thereto;

Figure 1:
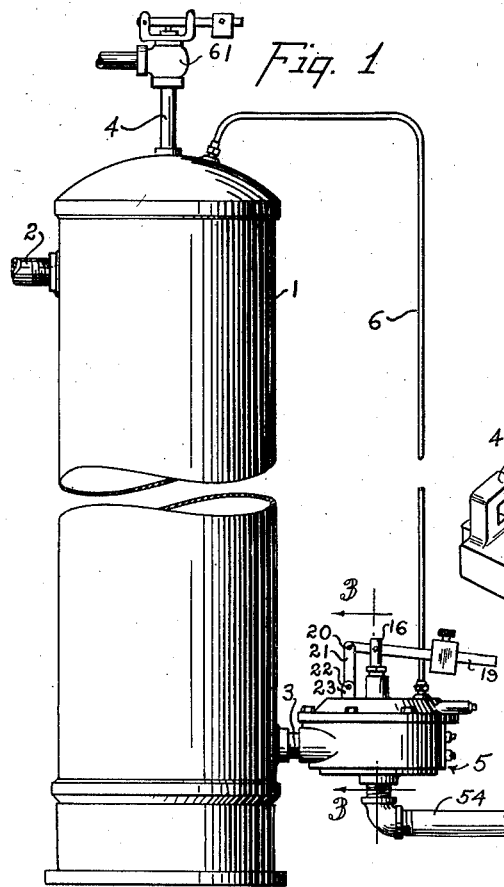

With more detailed reference to the drawings the numeral 1 designates a vessel having a fluid inlet pipe 2 and a liquid outlet pipe 3, and a gas outlet 4. The valve, generally designated by the numeral 5, has a pressure transmitting pipe 6 leading to the top of the vessel 1 so as to transmit pressure from the gas chamber within the vessel 1 to the chamber 7 formed in the upper portion of the valve 5. The valve 5 comprises a housing 8 and a cover plate 9, which cover plate 9 is attached to the housing 8 by means of bolts 10. A diaphragm member 11 is interposed between cover plate 9 and housing 8 so as to form a fluid tight joint therearound. The diaphragm 11 has a plate 12 on the upper side thereof and a plate 13 on the lower side, which plates 12 and 13 form a reinforcement throughout a substantial area of the diaphragm, and through which a bolt 14 passes, which bolt has a nut 15 thereon to secure the plates 12 and 13 in binding engagement with the diaphragm 11. The upper end of the bolt 14 is threaded and extends into valve stem 16, as will best be seen in Fig. 2. The valve stem 16 is bifurcated at 17, and has a transverse hole therethrough to receive a pin 18 passing through the valve stem and through outwardly extending valve actuated arm 19, which valve actuated arm 19 has a hole near the inner end thereof to receive a pin 20. The pin 20 passes through the upper end of link 21, which link is also pivoted at its lower end on pin 22 that passes through the link 22 and a lug 23 mounted on the top cover plate 9.

The valve housing cover plate 9 has a stuffing box 24 located axially thereof to receive a packing 25 around valve stem 16. A packing gland 26 is provided around valve stem 16 to provide for adjustment of packing 25. The stem 16 may be rotated relative to bolt 14 by removing the pin 18 and arm 19 from the hole and bifurcation, respectively, which will enable vertical adjustment of the stem relative to the diaphragm to enable the arm 19 to be raised or lowered.

A recess 27 is formed below stuffing box 24 to admit nut or gland 15 thereinto so the upper surface of the upper diaphragm reinforcing plate 12 will rest on the lower surface of valve housing cover plate 9, which will relieve the diaphragm of undue strain when the uppermost point of travel thereof has been reached.

The cover plate 9 has holes 28 and 29 formed therein to enable the connection of pressure lines thereto for automatic or remote operation of the control valve.

Figure 2:
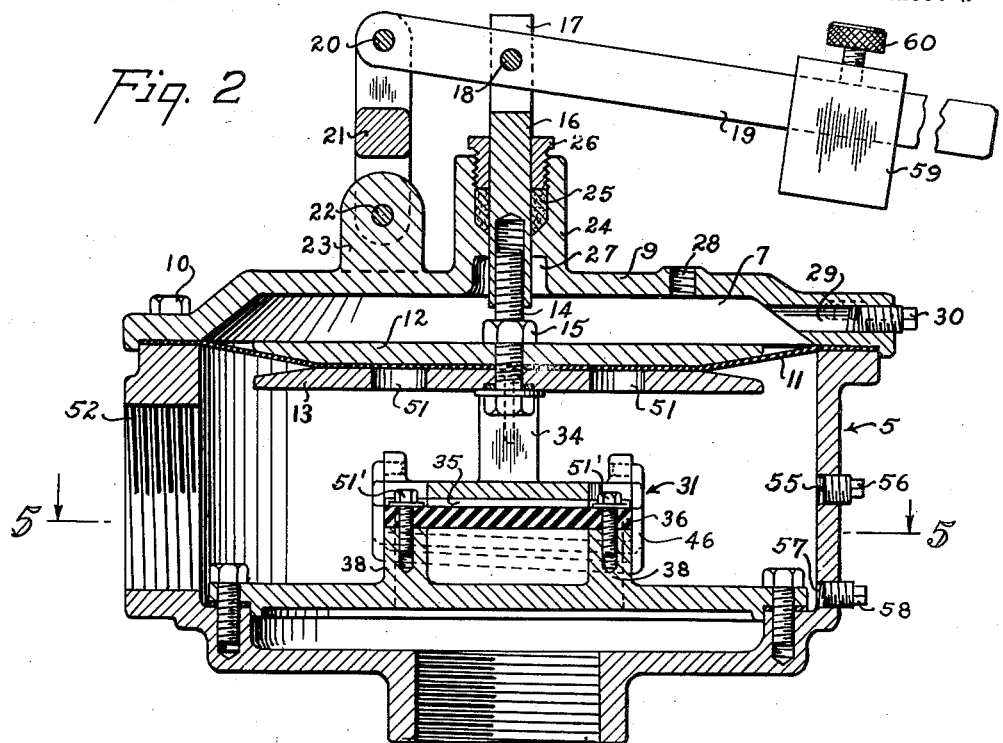
Fig. 2 is a vertical sectional view through the device showing the valve in closed position.

In the view shown in Figs. 1 and 2, a pressure transmitting pipe 6 may be connected to the cover plate 9 by threaded hole 28. The hole 29 provides for the drainage of liquid or condensate in chamber 7 above the diaphragm 11, and may be closed when desired by means of a plug 30. However, if desired, a further transmitting pipe may be connected through the hole 29 and lead to a manual or automatic control valve at a remote point to enable fluid pressure to be applied or released from chamber 7 to close or open the valve member 31 of the valve 5. The valve member 31 is attached to the lower diaphragm reinforcing plate 13 by means of screws 32 that interconnect with threaded lugs 34. The valve member 31 has a pressure plate 33, that has upstanding lugs 34 formed on the upper side thereof to which screws 32 engage. The lower side of the pressure plate 33 has a transverse recess 35 located centrally thereof so each end of the pressure plate 33 forms a separate pad to apply pressure to the flexible sealing member 36 that engages the upper end of orifice walls 37.

The flexible sealing member 36 is made of resilient material and preferably of a synthetic type rubber and is secured to upstanding lugs 38 formed on the upper side of orifice plate 39. The walls 37 forming orifices 40 in the orifice plate 39 are of a modified oval design, that is, one end of the oval is of lesser radius than the opposite end, with the intervening portion preferably having straight walls that interconnect the two radii at each of their ends. The orifices 41 are similar in size and shape to the orifices 40 and are formed in the orifice plate 39 on the opposite side of the upstanding lugs 38 from the orifices 40, but are positioned in inverse relation so as to give even, graduated increase in flow of liquid therethrough as will be more fully explained hereinafter.

The orifice plate 39 is fitted in the lower portion of valve housing 8 and has a gasket 42 interposed between the orifice plate 39 and the housing 8 so as to form a fluidtight seal therebetween. The orifice plate 39 is held in place by bolts 43 screw threaded into the valve housing 8.

The orifices 40 and 41 have transverse ribs 44 and 45, respectively thereacross to prevent the flexible sealing member 36 from extending downward too far into the orifices 40—41 upon application of pressure to the flexible sealing member.

Figure 4:
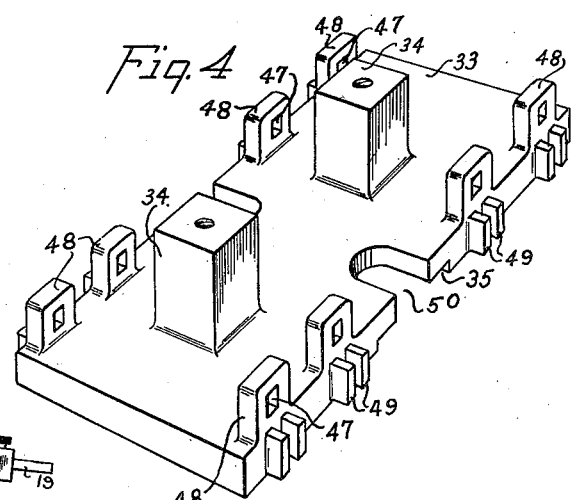
Fig. 4 is a perspective view of the valve pressure plate removed from the valve.
Figure 6:
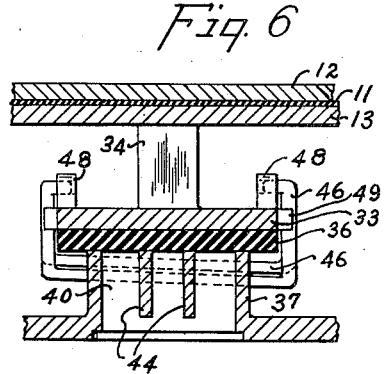
Fig. 6 is a fragmentary sectional view taken on the line 6—6 of Fig. 3, looking in the direction indicated by the arrows.

Bails 46 and 46a having in-turned upper ends, interengage with holes 47 formed in lugs 48 on the upper surface of pressure plate 33, as will best be seen in Figs. 4 and 6. The upper surface of the transverse portion of bails 46—46a are each angularly divergent with respect to the lower surface of flexible sealing member 36 and passes therebelow.

The bails 46—46a have the upper surfaces of their transverse portions parallel with respect to each other and are positioned on one end of pressure plate 33, with the bail in parallel relation with the outer orifice wall of each of the orifices. However, the angle of divergence of these bails is such that the lower end of the outer bail is substantially equidistant from the lower face of the flexible sealing member 36 and the upper end of the inner bail 46. In this manner, the outer bail will engage the flexible sealing member 36 and lift it with a peeling action from one end of the outer orifice until the opposite end of the orifice is lifted clear by the opposite end of the bail 46, then the second bail 46 will engage the flexible sealing member 36 to cause a continuity of lift of the flexible sealing member upon the raising of pressure plate 33. However, as this procedure of opening the valve is progressing the flexible sealing member 36 is being lifted at its opposite diagonal corner by bails 46a that are arranged in a complementary manner with reversely disposed angles operating on the oppositely disposed corners of the flexible member 36 to open the oppositely disposed orifices 40 and 41. The bails are held in a perpendicular position with respect to pressure plate 33 by lugs 49 extending outward from each side thereof and on each side of bails 46—46a.

Figure 5:
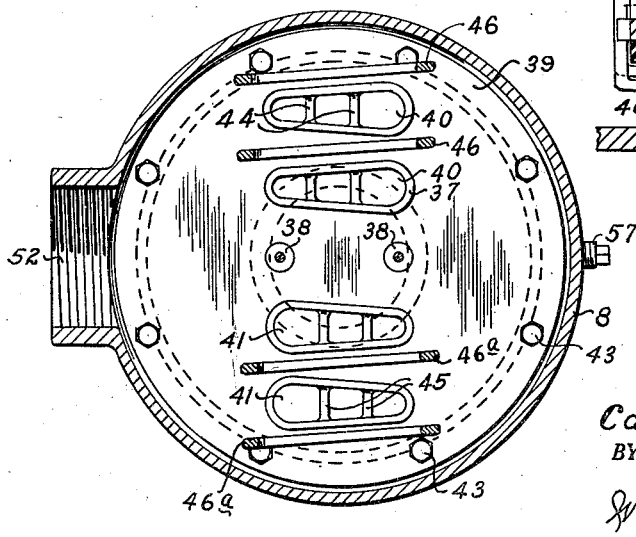
Fig. 5 is a sectional view taken on the line 5—5 of Fig. 2, looking in the direction indicated by the arrows.
Figure 3:
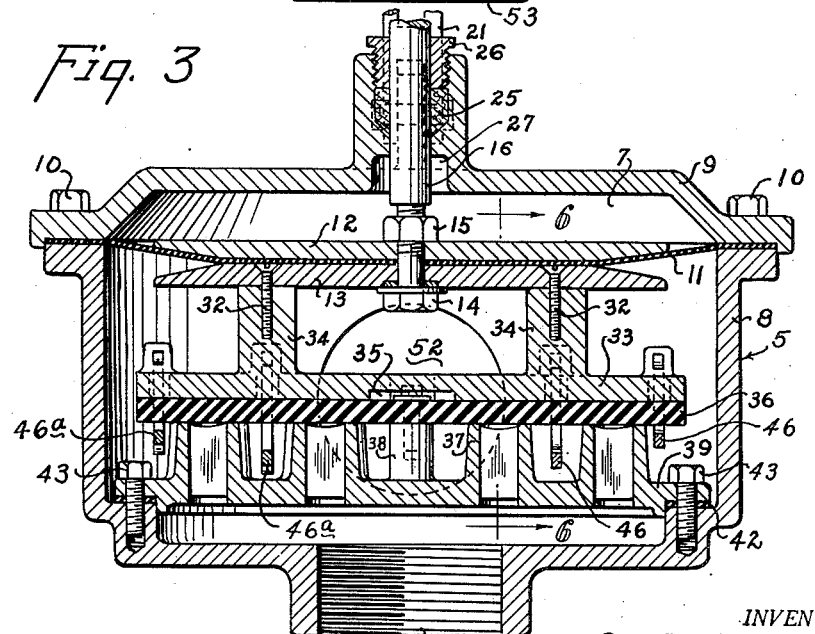
Fig. 3 is a sectional view of the valve in closed position, taken substantially along the line 3—3 of Fig. 1, looking in the direction indicated by the arrows.

Transverse ribs 44 and 45 are transversely concave so as to permit sealing action of flexible member 36 over the upper walls 37 that surround orifices 40—41, as is best seen in Figs. 3 and 5.

The pressure plate 33 has notches 50 formed in opposite sides thereof, as will best be seen in Figs. 2 and 4, to facilitate the tightening of bolts 51' that secure the flexible sealing member 36 to the upstanding lugs 38.

Holes 51 are also provided in the lower diaphragm reinforcing plate 13 to admit the passing of a tool therethrough to tighten bolts 51' when the diaphragm 11 and upper diaphragm reinforcing plate 12 are removed.

The valve housing 8 is provided with an inlet 52 and an outlet 53 in the side and bottom thereof, respectively. These are shown to be screw threaded for the attachment of pipe thereto, however, it is to be pointed out that other connections, such as flanges or the like are considered to be the equivalent of the connection shown and to come within the scope of the disclosure. Such connections as shown are for the attachment of inlet pipe 3 and outlet pipe 54 respectively. A hole 55 is provided in the side of valve housing 8 and through which the liquid level therein may be checked, or samples taken therefrom. This hole is normally closed by means of a plug 56. A further hole 57 is provided in the lower portion of the valve housing for draining the housing to prevent freezing or the like, and this hole may be closed by means of a plug 58 as will best be seen in Figs. 1 and 2.

The arm 19 is normally provided with a weight 59 which has an aperture therein to receive the arm 19 and which weight is movable therealong and which may be secured in place by a thumb screw 60, when the proper operating arrangement has been obtained.

*Operation*

The control valve herein described is shown attached to a vessel 1, which may be a separator, a tank, or other vessel in which both liquid and gaseous pressure is maintained at a given hydrostatic head and which gaseous pressure is to be maintained at a given back pressure in the vessel, as by a relief valve 61 that is set to maintain a given pressure in the vessel 1. As gas and liquid flow into the vessel 1, the gas rises to the upper portion of the vessel and the liquid will settle into the lower portion thereof for outlet through pipe 3, which is the inlet pipe into valve 5. As the liquid and gas accumulate in the vessel 1, the gas will exert pressure through pressure transmitting pipe 6 on the upper surface of diaphragm 11 and the pressure applied to pressure plate 33 will be proportionate to the pressure applied to the diaphragm times the area of the diaphragm, which pressure is transmitted to pressure plate 13 to cause a sealing action by flexible sealing member 36 with the upper edges of orifice walls 37 and as long as the pressure above the diaphragm plus the weight of the weight 59 acting on arm 19 is greater than the pressure applied below the diaphragm 11, the flexible sealing member 36 will remain seated with respect to the orifice walls 37, however, as the hydrostatic head in the vessel 1 increases to equal or exceeding the above mentioned pressure the diaphragm 11 will lift pressure plate 33 upward until the outer bails 46 and 46a on each end of the pressure plate 33 lifts opposite diagonal corners of the flexible sealing member 36 sufficient to allow liquid to flow into the orifices 40—41 and as the pressure is sufficiently high, to continue to raise the diaphragm 11, the flow will be increased until the flexible sealing member 36 is lifted clear of the outer orifices 40—41, whereupon, as the last portion of the flexible sealing member 36 is lifted from the outer orifices 40—41, the inner bails 46—46a begin to engage the flexible sealing member 36 adjacent the inner orifices 40—41 so as to lift the flexible sealing member 36 higher to open the inner orifices 40—41. However, if the hydrostatic head should decrease by the out-flow of liquid from the vessel 1, the flexible sealing member 36 will be lowered so as to maintain the flow even for a given differential of pressures above and below the diaphragm 11.

While the present drawings show only two orifices on each side of upstanding lugs 38, it is to be pointed out that this is merely representative of a multiplicity of these orifices that may be employed, within reasonable limits. One or more such orifices may be used by employing the successively longer bails with each succeeding bail starting to lift the flexible sealing element as the preceding bail has finished the opening of the preceding orifice.

While the invention has been described with particular reference to a valve operating with a pressure line leading to the upper portion of the vessel from which the liquid is flowed, it is to be pointed out that this line may be extended to a remote point and have a manual or automatic control valve thereon to control the flow of liquid through the control valve.

It is to be understood that changes may be made in the minor details of construction and adaptation made to different installations, without departing from the spirit of the invention as set out in the appended claims.

Having thus described the invention, what is claimed is:

1. In a fluid control valve, a body having a chamber formed therein, a fluid inlet opening and a fluid outlet opening formed in said body, each of said openings being in communication with said chamber, a plurality of elongated orifices formed in said valve body and positioned between said inlet opening and said outlet opening, a flexible valve element positioned over said elongated orifices and cooperable therewith for opening and closing said elongated orifices, which flexible valve element is positioned intermediate said inlet opening and said outlet opening, a pressure plate secured to said flexible valve element intermediate the ends thereof for moving said flexible valve element with respect to said orifices, means for moving said pressure plate, valve lifting elements attached to said pressure plate and spaced at intervals along the length thereof and projecting to the opposite side of said flexible valve element and being in substantially longitudinal alignment with respective adjacent elongated orifices, each of said valve lifting elements having an obliquely disposed upper surface with respect to the length thereof, said lifting elements, having obliquely disposed upper surfaces, being positioned below said flexible valve element so upon movement of said pressure plate away from said orifices said flexible valve element will be lifted progressively from one end to the other end of the respective orifices and said orifices will be opened successively one after the other and close conversely.

2. In a fluid control valve, a body having a chamber formed therein, a fluid inlet opening and a fluid outlet opening formed in said body, each of said openings being in communication with said chamber, a plurality of elongated wedge-shaped orifices formed in said valve body and positioned between said inlet and said outlet openings, a rectangular, flexible valve element positioned over said orifices and cooperable therewith for opening and closing said orifices in said valve body, which rectangular, flexible valve element is positioned intermediate said inlet opening and said outlet opening, a pressure plate secured to said rectangular, flexible valve element intermediate the ends thereof for moving said flexible element with respect to said orifices, means for moving said pressure plate, valve lifting elements attached to said pressure plate at spaced intervals along the length thereof and projecting to the opposite side of said flexible element and being in substantial longitudinal alignment with respective adjacent elongated, wedge-shaped orifices, each of said valve lifting elements having an obliquely disposed upper surface with respect to the length thereof, said valve lifting elements being inversely arranged on each side of a medial plane passing transversely through said rectangular, flexible valve element, said valve lifting elements, having obliquely disposed upper surfaces, being disposed below said rectangular, flexible element so upon moving said pressure plate away from said orifices said flexible valve element will be lifted on opposite diagonal corners so as to be lifted progressively from the apex to the large end of the respective orifices and to successively open the orifices one after the other, and the movement of said pressure plate toward said orifices to close said orifices in converse manner.

3. In a fluid control valve, a body having a chamber formed therein, a fluid inlet opening and a fluid outlet opening formed therein, each of said openings being in communication with said chamber, a plurality of elongated, wedge-shaped orifices formed in said valve body and positioned between said inlet opening and said outlet opening, each of said wedge-shaped orifices having transverse ribs extending thereacross, a rectangular, flexible valve element positioned over said orifices and cooperable therewith for opening and closing said orifices in said valve body, which rectangular flexible valve element is positioned intermediate said inlet opening and said outlet opening, a pressure plate secured to said rectangular, flexible valve element intermediate the ends thereof for moving said flexible element with respect to said orifices, means for moving said pressure plate, valve lifting elements attached to said pressure plate at spaced intervals along the length thereof and projecting to the opposite side of said flexible valve element and being in substantial longitudinal alignment with respect to adjacent elongated, wedge-shaped orifices, each of said valve lifting elements having an obliquely disposed upper surface with respect to the length thereof, said valve lifting elements being inversely arranged on each side of a medial plane passing transversely through said rectangular flexible valve element, which valve lifting elements having obliquely disposed upper surfaces, are positioned below said flexible valve element so upon movement of said pressure plate away from said orifices, said flexible valve element will be lifted progressively from the apex to the large end of the respective orifices and to successively open the orifices one after another, and to move said pressure plate toward said orifices will close said orifices in a converse manner.

4. In a fluid control valve, a body having a chamber formed therein, a fluid inlet opening and a fluid outlet opening formed in said body, each of said openings being in communication with said chamber, a removable plate mounted in said valve body intermediate said inlet and said outlet openings and having wedge-shaped orifices formed therein, which orifices have raised walls therearound with transverse ribs positioned across each of said orifices intermediate their ends, said orifices being positioned intermediate said inlet opening and said outlet opening and having their wedge-shaped elongated portions arranged inversely with respect to the groups on opposite sides of a medial plane passing through said removable plate parallel to said orifices, a resilient, flexible valve element secured intermediate the ends of said removable plate and having the opposite ends thereof freely movable with respect thereto, a pressure plate positioned above said resilient, flexible valve element and having a plurality of transversely disposed, inversely arranged valve lifting elements projecting downward therefrom, each of said lifting elements having an angularly disposed upper face portion with respect to the normal face of said pressure plate and extending below said resilient, flexible valve element so upon upward movement of said pressure plate and said transverse lifting elements, opposite corners of said resilient element will be lifted, and means for lifting said pressure plate and said transverse lifting elements to lift said flexible valve element.

5. In a fluid control valve, a body having a chamber formed therein, a diaphragm positioned in the upper portion of said chamber in said body and dividing said chamber into first and second fluidtight compartments, said body having a fluid inlet opening and a fluid outlet opening formed in said body and in communication with said first fluidtight compartment, one side of said diaphragm being responsive to pressure of fluid flowing into said first compartment, the other side of said diaphragm being responsive to the pressure of fluid in said second compartment, a fluid conduit connected to said second compartment for transmitting pressure from a remote point to said diaphragm for actuation thereof, a transverse baffle fitted in said first compartment intermediate said inlet opening and said outlet opening, which baffle has a plurality of apertures formed therein, with one side of said baffle forming a valve seat, a flexible valve element connected to said diaphragm and operable thereby, said flexible valve element being in seating relation on said valve seat to progressively close said apertures in said baffle between said fluid inlet opening and said fluid outlet opening, and means for applying pressure to said diaphragm to hold said flexible valve elements in seated relation.

6. In a fluid control valve, a body having a chamber formed therein, fluid pressure responsive means positioned in a portion of said chamber in said body and dividing said chamber into first and second fluidtight compartments, a fluid inlet opening and a fluid outlet opening formed in said body and being in communication with said first compartment, one side of said fluid responsive means being responsive to pressure of fluid flowing into said body, the other side of said fluid pressure responsive means being responsive to fluid pressure in a conduit connected thereto for transmitting pressure from a fluid pressure means located at a remote point, said body having a plurality of transversely disposed, elongated, wedge-shaped orifices formed therein, and positioned between said inlet opening and said outlet opening, and a flexible valve element attached to and operable by said fluid pressure responsive means for initially opening the apex end of said wedge-shaped orifices and closing said orifices laterally, said flexible valve element being interposed between said fluid inlet opening and said orifices which lead to said fluid outlet opening for controlling the flow of fluid through said orifices in said valve.

7. In a fluid control valve, a body having a chamber formed therein, a fluid pressure responsive means positioned in the upper portion of said chamber in said valve body and dividing said chamber into first and second fluidtight compartments, a fluid inlet opening and a fluid outlet opening formed in said body and being in communication with said first compartment, one side of said fluid pressure responsive means being responsive to pressure of fluid flowing into said body, the other side of said fluid pressure responsive means being responsive to fluid pressure in a conduit connected thereto for transmitting pressure from a pressure means at a remote point, said body having a plurality of elongated, wedge-shaped orifices formed therein, each of said orifices having transverse ribs extending thereacross, and a flexible valve element attached to and operable by said fluid pressure responsive means for opening each of said orifices progressively from the apex end thereof to the large end thereof and conversely closing from the large end to the apex end of the respective orifices, said flexible valve element being interposed between said fluid inlet and said orifices leading to said fluid outlet so as to control the flow of fluid through said orifices in said valve.

8. In a fluid control valve, a body having a chamber formed therein, fluid pressure responsive means positioned in the upper portion of said chamber within said body and dividing said chamber into first and second fluidtight compartments, a fluid inlet opening and a fluid outlet opening formed in said body and being in communication with said first compartment, one side of said fluid pressure responsive means being responsive to pressure of fluid flowing into said body, the other side of said fluid pressure responsive means being responsive to fluid pressure in a conduit connected thereto for transmitting pressure from a pressure means at a remote point, said valve body having a plurality of elongated, wedge-shaped orifices formed therein on each side of a medial plane passing through said body, said wedge-shaped orifices on one side of said medial plane being inversely arranged with respect to the wedge-shaped orifices on the opposite side of said medial plane, and a flexible valve element attached to and operable by said pressure responsive means for opening said orifices progressively from the apex end thereof to the large end thereof and conversely closing from the large end to the apex of the respective orifices, said valve element being interposed between said fluid inlet opening and said orifices in said valve body which lead to said fluid outlet openings to control the flow of fluid through said orifices in said valve.

9. In a control valve, a body having a chamber formed therein, a transverse diaphragm mounted transversely of said valve body and dividing said chamber into first and second fluidtight compartments, said body having a fluid inlet opening and a fluid outlet opening formed therein and in communication with said first compartment, one side of said transverse diaphragm being responsive to the pressure of fluid flowing into said first compartment, the other side of said diaphragm being responsive to fluid pressure in said second compartment, a fluid conduit connected to said second compartment and to a source of pressure, a transverse baffle, having orifices formed therein, fixed within said first compartment intermediate said fluid inlet opening and said fluid outlet opening, one side of said baffle forming a valve seat for said orfices, a flexible, rubber-like sealing element seated in complementary relation with respect to said valve seat of said transverse baffle for opening and closing said orifices, said flexible, rubber-like sealing element being operably connected, by means of lifting elements, to said diaphragm so upon movement of said diaphragm said sealing element progressively opens or closes said orifices in said transverse baffle so as to open or close said fluid passage between said inlet opening and said outlet opening for selectively controlling the flow of fluid through said valve.

References Cited in the file of this patent

UNITED STATES PATENTS

| Number | Name | Date |
|---|---|---|
| 602,657 | Franklin | Apr. 19, 1898 |
| 661,372 | Grote | Nov. 6, 1900 |
| 693,961 | Flinn | Feb. 25, 1901 |
| 1,806,791 | Davis | May 26, 1931 |
| 2,009,696 | King | July 30, 1935 |
| 2,095,842 | Steenstrup | Oct. 12, 1937 |
| 2,135,585 | Long | Nov. 8, 1938 |
| 2,389,720 | Drane | Nov. 27, 1945 |
| 2,548,374 | Janson | Apr. 10, 1951 |
| 2,563,665 | Thomas | Aug. 7, 1951 |
| 2,679,863 | Tucker | June 1, 1954 |